(12) United States Patent
Straeter

(10) Patent No.: US 7,856,800 B2
(45) Date of Patent: Dec. 28, 2010

(54) CHOPPER ASSEMBLY FOR A HARVESTING IMPLEMENT

(76) Inventor: James E. Straeter, 914 E. 100 S., Rochester, IN (US) 46975

( * ) Notice: Subject to any disclaimer, the term of this patent is extended or adjusted under 35 U.S.C. 154(b) by 11 days.

(21) Appl. No.: 12/420,494

(22) Filed: Apr. 8, 2009

(65) Prior Publication Data

US 2010/0257831 A1 Oct. 14, 2010

(51) Int. Cl.
*A01D 45/02* (2006.01)

(52) U.S. Cl. ............................. 56/60; 56/500; 56/503

(58) Field of Classification Search ............. 56/16.4 A, 56/16.4 D, 51, 52, 60, 500–505
See application file for complete search history.

(56) References Cited

U.S. PATENT DOCUMENTS

| | | | |
|---|---|---|---|
| 2,634,569 A * | 4/1953 | Raney et al. | 56/14.3 |
| 2,877,616 A * | 3/1959 | Gewalt et al. | 56/13.4 |
| 3,208,206 A | 9/1965 | Lundell | |
| 3,599,404 A | 8/1971 | Fernandez et al. | |
| 3,680,291 A | 8/1972 | Soteropulos | |
| 3,984,966 A * | 10/1976 | Outtier | 56/10.2 R |
| 4,083,167 A | 4/1978 | Lindblom et al. | |
| 4,148,175 A | 4/1979 | Miller | |
| 4,182,098 A | 1/1980 | Kass | |
| 4,251,980 A | 2/1981 | Miller | |
| 4,373,536 A | 2/1983 | da Silva | |
| 4,510,948 A | 4/1985 | Dekeyzer | |
| 4,581,878 A | 4/1986 | Vida et al. | |
| 4,594,842 A * | 6/1986 | Wolters et al. | 56/94 |
| 4,622,804 A | 11/1986 | Krone et al. | |
| 4,691,505 A * | 9/1987 | Browne | 56/503 |
| 4,926,623 A | 5/1990 | Fiener | |
| 5,052,170 A | 10/1991 | Trenkamp et al. | |
| 5,330,114 A * | 7/1994 | Trenkamp et al. | 241/101.77 |
| 5,875,622 A | 3/1999 | Stoll | |
| 6,073,429 A | 6/2000 | Wuebbels et al. | |
| 6,412,259 B1 * | 7/2002 | Wiegert | 56/60 |
| 7,047,717 B1 * | 5/2006 | Wolters et al. | 56/60 |
| 7,063,614 B2 | 6/2006 | Vogelgesang et al. | |
| 2007/0037621 A1 | 2/2007 | Isfort | |

* cited by examiner

*Primary Examiner*—Alicia M Torres

(57) ABSTRACT

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

12 Claims, 4 Drawing Sheets

CHOPPER ASSEMBLY FOR A HARVESTING IMPLEMENT

FIELD OF THE INVENTION

This invention relates to a chopper assembly. More particularly, this invention relates to a chopper assembly for a harvesting implement.

BACKGROUND OF THE INVENTION

Harvesting corn is well known in the art. Conventionally, corn pickers remove the ears from the stalks and process those ears on through the machine, while leaving the stalks flattened against the ground and secured to their root structure. The stalks left in this condition are difficult to pick up and utilize for corn fodder, silage or biomass. To improve upon this, devices have been developed that not only remove the ears of corn from the stalks, but also cut the stalks and put them into a windrow whereupon they can be easily picked up and utilized as desired, such as by being processed through a chopping machine.

While these devices have provided some improvement in the art, there are still deficiencies preventing commercial adoption. To begin, these devices require many moving parts, are complex to manufacture, and are susceptible to wear. In addition, the devices are built into the machine and therefore are difficult to remove and repair. Finally, because these devices are built into the machines they are not adaptable for use on different corn heads for desired applications. Accordingly, there exists a need in the art for a device that addresses these deficiencies.

Therefore, an object of the present invention is to provide a chopping assembly for a harvesting implement that has fewer moving parts.

Another objective is to provide a dedicated chopper/transport assembly for each individual row without impacting adjacent rows.

Yet another object of the present invention is to provide a chopping device for a harvesting implement that is removable.

A still further object of the present invention is to provide a chopping assembly for a harvesting implement that is adaptable to different sized corn headers.

These and other objects, features, or advantages of the present invention will become apparent from the specification and claims.

SUMMARY OF THE INVENTION

A chopping assembly for a harvesting implement having a blade assembly, a housing, and a guide. The blade assembly is disposed within the housing and the guide directs cornstalks toward an input port on the housing. The blade assembly not only cuts the cornstalk from its root but also chops the stalk into stover. A fluid dynamic force is created by the blade assembly to direct the stover with the aid of the housing to an output port.

DETAILED DESCRIPTION OF THE PREFERRED EMBODIMENT

Figure 1:
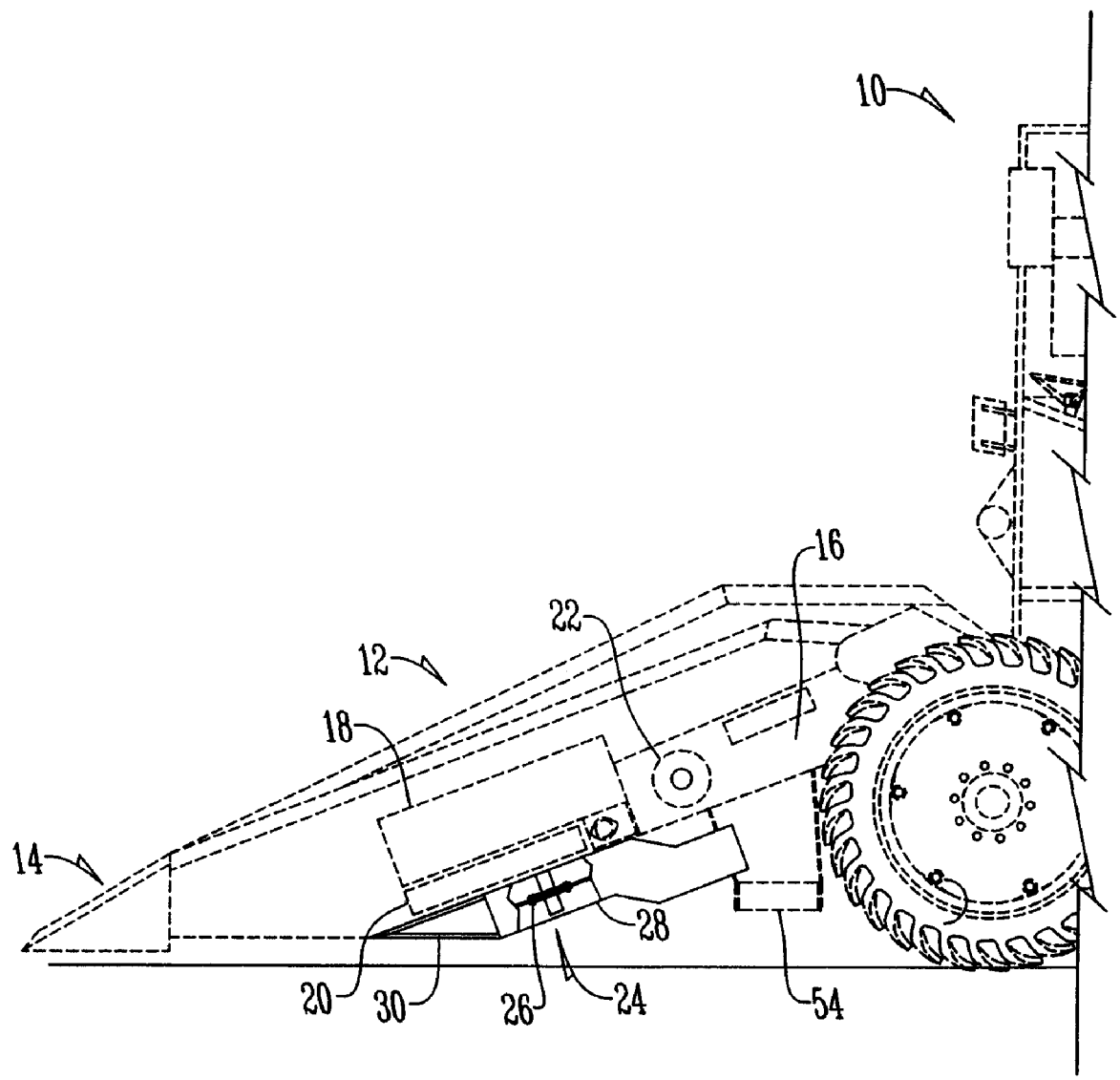
FIG. 1 is a side elevational view of a combine having a corn head with an attached chopper assembly.
Figure 2:
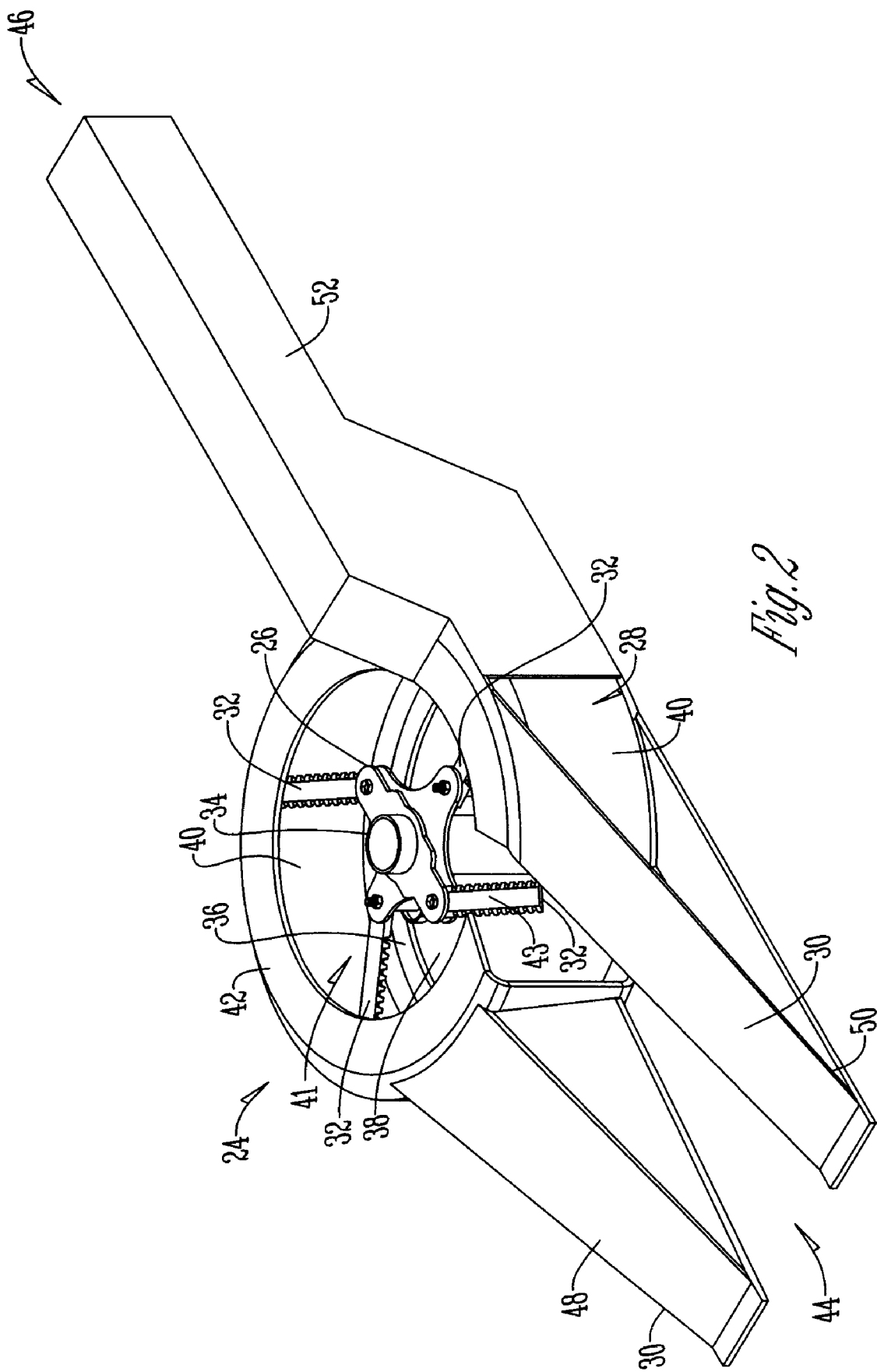
FIG. 2 is a bottom perspective view of a chopper assembly.
Figure 3:
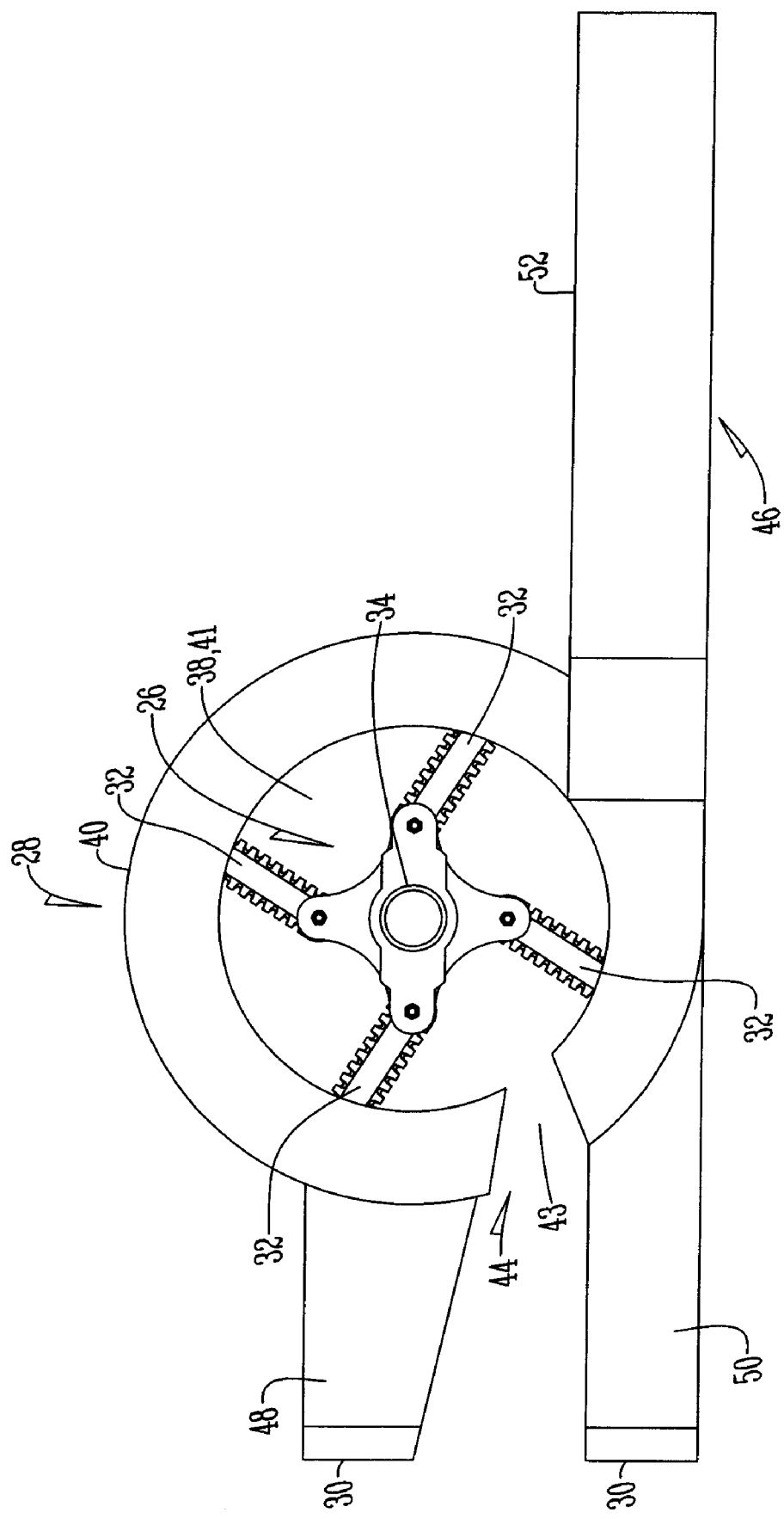
FIG. 3 is a bottom elevational view of a chopper assembly.
Figure 4:
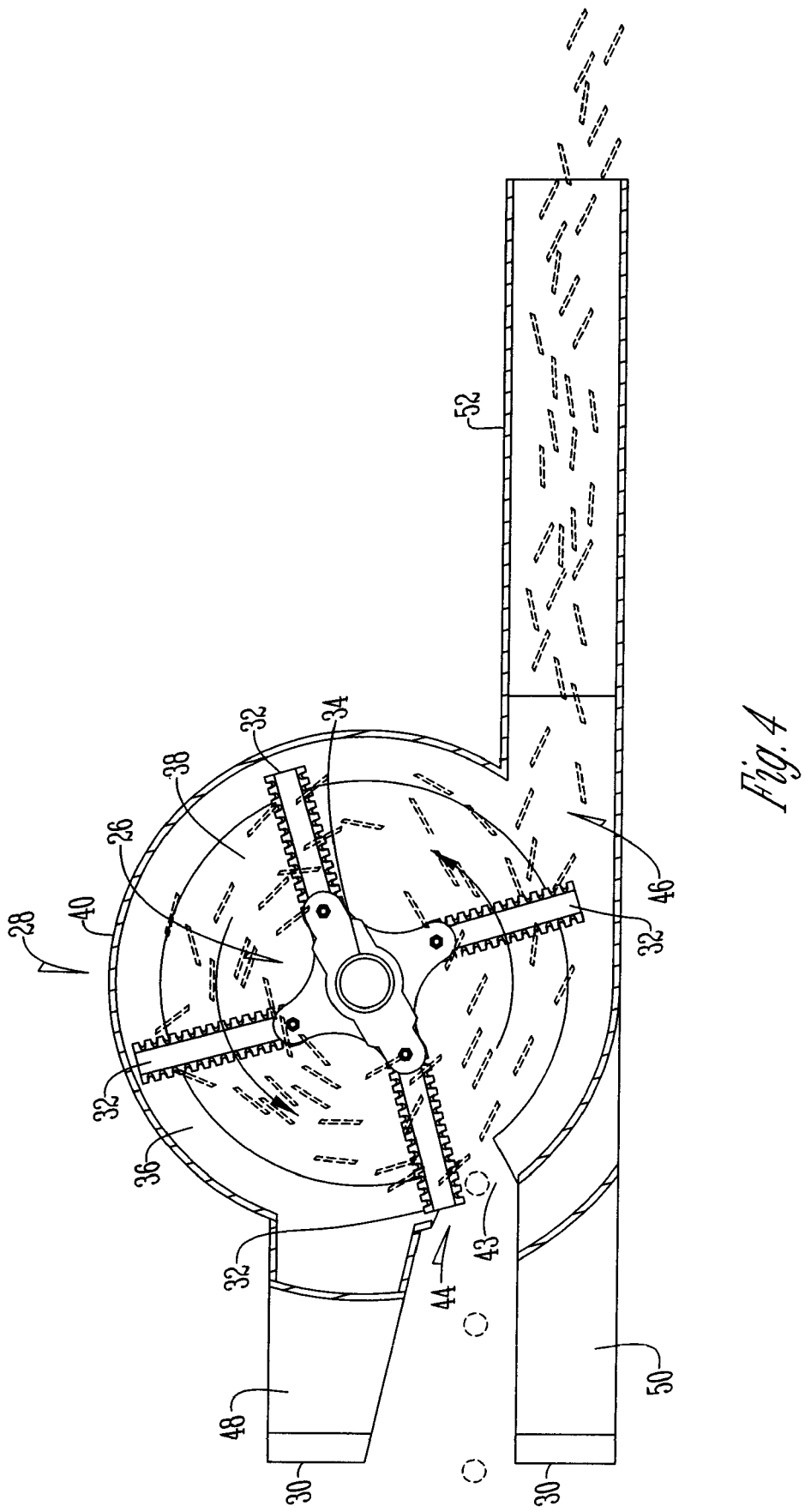
FIG. 4 is a bottom sectional view of a chopper assembly.

With reference to the figures, a harvesting implement 10, such as a combine, has a corn head 12 carried by the combine. The corn head 12 has a plurality of gathering shoes 14 and a frame 16. Positioned between each pair of adjacent gathering shoes 14 is a picking assembly 18 which has stalk rolls 20 that interact with the cornstalks and ears of corn, and an auger 22 positioned behind the picking assembly 18 to direct the picked corn to a desired location.

The chopping assembly 24 is positioned below and mounted to the corn head 12. The chopping assembly 24 includes a blade assembly 26, a housing 28, and a chopper guide 30. The blade assembly 26 includes a plurality of blades 32 that are attached to and extended outwardly from a drive shaft 34. The drive shaft 34 is connected to a source of power (not shown).

Surrounding the blade assembly 26 is a housing 28. The housing 28 has a top wall 36 connected to the corn head frame 16 with an opening 38 through which the drive shaft 34 extends, an arcuate side wall 40 and a bottom wall 42 having an opening 41 and a slot 43. The side wall 40 has an input port 44 and an output port 46.

The chopper guide 30 includes two elongated members 48, 50. The elongated members 48, 50 are mounted in spaced angled relation to the bottom of the corn head 12 at one end and the bottom of the housing 28 at the opposite end. The angle of the elongated members 48, 50 tapers downwardly and inwardly from the corn head 12 to the housing 28.

Mounted to and in communication with the output port 46 is an outwardly extending exhaust channel or conduit 52. The exhaust channel 52 is adjacent to a conveyor 54 at the end remote from the exhaust port 46.

In operation, as the harvesting implement moves forward cornstalks are directed toward the picking assembly 18 by the gathering shoes 14. The picking assembly 18 engages the cornstalk with the stalk rolls 20 to separate the ear of corn from the stalk. The ear of corn is then transported by the auger 22 to its desired location.

As the picking assembly 18 is engaging the stalk to separate the ear of corn from the stalk, the stalk is captured by the elongated guide members 48 and 50 and directed toward the input port 44 of housing 28. As the stalk enters the input port 44 and is captured in the slot 43, the blades 32, which are rotated by drive shaft 34, cut the stalk from its roots and further cuts the stalk into stover. Also, debris from the picking assembly 18 falls through the opening 38 in the top wall 36 and is added to the stover. The rotation of the blades 32 creates a fluid dynamic force that blows the stover, with assistance of the housing 28, out of the output port 46, through the exhaust channel 52 to the conveyor 54. The conveyor 54 transports the stover to a windrow position.

What is claimed is:

1. A chopping assembly for a harvesting implement, comprising:

a corn head mounted to a frame;

an arcuate housing mounted to the corn head and having an input port and an output port wherein the top wall of the housing is mounted flush to the corn head's bottom surface;

a blade assembly disposed within the arcuate housing; and an exhaust channel mounted to the housing wherein the exhaust channel extends rearwardly away from the output port of the housing and downwardly offset and spaced away from the corn header's bottom surface, to an output port of the exhaust channel.

2. The chopping assembly of claim 1 wherein the exhaust channel is connected to and in communication with the output port of the housing.

3. The chopping assembly of claim 1 further comprising a pair of elongated guide members that are mounted to and extend between the corn head and the housing.

4. The chopping assembly of claim 3 wherein the elongated guide members are positioned on either side of the input port.

5. The chopping assembly of claim 1 further comprising a conveyor positioned adjacent the output port of the exhaust channel at an end of the exhaust channel.

6. The chopping assembly of claim 1 wherein the blade assembly comprises a plurality of blades having teeth.

7. The chopping assembly of claim 1 wherein the housing has a side wall and a bottom wall.

8. The chopping assembly of claim 7 wherein the bottom wall has a slot positioned at the input port.

9. The chopping assembly of claim 1 wherein the blade assembly includes a plurality of blades extending outwardly from a drive shaft.

10. The chopping assembly of claim 1 further comprising the housing having a sidewall that is arcuate.

11. The chopping assembly of claim 1 wherein the housing's top wall has an opening such that stover falls through the opening.

12. The chopping assembly of claim 1 wherein the blade assembly is positioned to cut a cornstalk received within the input port from its root and chop the cornstalk into stover, wherein the blade assembly creates a fluid dynamic force to direct the stover through the output port.

* * * * *